Oct. 1, 1957
J. T. LANDGRAF
2,808,028
POULTRY FEEDER
Filed Sept. 29, 1955
2 Sheets-Sheet 1
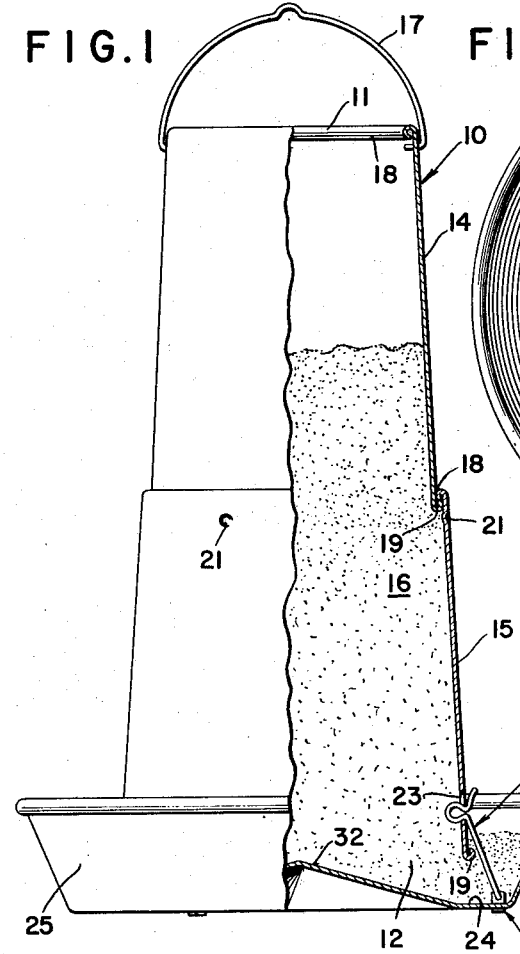
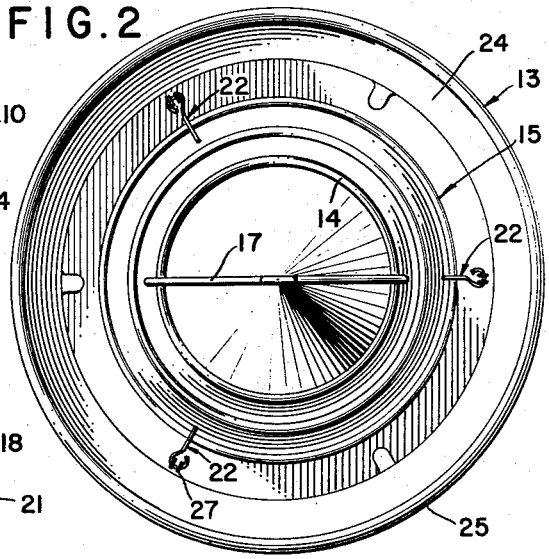
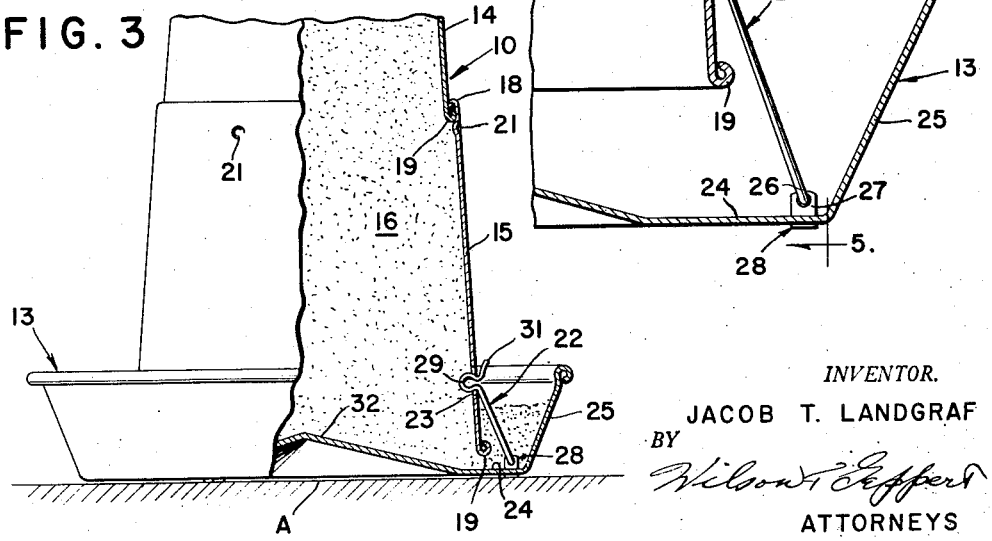
INVENTOR.
JACOB T. LANDGRAF
BY
Wilson T. Geppert
ATTORNEYS Oct. 1, 1957 J. T. LANDGRAF 2,808,028
POULTRY FEEDER
Filed Sept. 29, 1955 2 Sheets-Sheet 2

INVENTOR.
JACOB T. LANDGRAF
BY
ATTORNEYS

United States Patent Office 2,808,028
Patented Oct. 1, 1957

2,808,028
POULTRY FEEDER

Jacob T. Landgraf, Freeport, Ill., assignor to H. D. Hudson Manufacturing Company, Chicago, Ill., a corporation of Minnesota Application September 29, 1955, Serial No. 537,481

4 Claims. (Cl. 119—53)

The present invention relates to a novel poultry feeder comprising a hopper for containing feed and a feed pan mounted upon the lower end thereof, with the hopper and feed pan connected and supported in a novel manner.

A feeding device of the present construction is adapted to be supported and suspended above the floor or ground or to be mounted on the floor, ground or other supporting surface, and comprises a hopper of frusto-conical or downwardly and outwardly tapered conformation to prevent clogging and to assure a free flow of the contained feed, and a pan disposed beneath and connected to the hopper for vertical adjustment relative thereto, the lower open end of the hopper and the pan being so adjusted relative to each other that the feed flows from the hopper to the feed pan by gravity in controllable amounts and in such manner that the feed initially fed to the pan must be eaten before a fresh supply is made available.

By providing the lower section of the hopper with a plurality of vertically staggered slots or notches so arranged as to permit vertical adjustment of the hopper relative to the feed pan, and providing the pan with novel latching members each having a part insertable into any one of plural sets of slots or notches, the size of the annular discharge opening from the lower end of the hopper to the pan may be readily varied in accordance with the type or size of feed to be dispensed and the position of the pan with respect to the floor or ground whereby it may be adjusted in accordance with the age or size of the poultry to be fed.

Among the objects of the present invention is the provision of a novel means and manner of adjustably and detachably mounting and joining the lower hopper section of a pair of telescoping sections or the lower end of the hopper to the feeding pan whereby the feeding device is capable of use either as a hanging feeder or with the pan resting upon the floor, ground or supporting surface and supporting the hopper in elevated position.

A further object of the present invention is to provide the feed pan with a plurality of spaced latches or hook members so constructed and pivotally mounted whereby the hook on the free end of each of these members may be received in any one of a series of aligned and vertically spaced slots so arranged as to receive the hooks and support the lower end of the hopper and the feed pan in various positions of adjustment and to support the hopper in elevated position when the pan is set or supported upon the floor or ground.

The present invention further comprehends a novel latch or hook assembly in which the outer or free end of the latch or hook member is so contoured that it functions in a dual capacity in that it connects the feed pan and the hopper when the latter is suspended and the feed pan is in elevated position above the floor or ground, and also supports this hopper in its elevated position when the feed pan is supported upon the floor or ground as when the feeder is employed for chicks or small poultry incapable of reaching the pan when suspended in elevated position.

Another object of the present invention is the provision of a novel means and manner of pivotally mounting one end of each of the latches or hook members in the pan whereby these latches or hook members when not in use will lie in the bottom of the pan and permit a plurality of these pans to be nested together for storage or shipping purposes without the use of any fillers or cardboard liners.

Further objects are to provide a construction of maximum simplicity, efficiency, economy and ease of assembly and operation, and such further objects, advantages and capabilities as will later more fully appear and are inherently possessed thereby.

The present invention is an improvement over that disclosed in my co-pending application Serial No. 429,727, filed May 14, 1954.

In the drawings:

Figure 1 is a view in side elevation of the novel poultry feeder assembled and in hanging or suspended position, but with portions thereof broken away to show the internal construction of the hopper sections and the feed pan.

Fig. 2 is a top plan view of the assembled feeder of Fig. 1.

Fig. 3 is a fragmentary view, part in side elevation and part in vertical cross section, of the poultry feeder, but in place of it being suspended the feed pan is shown as resting upon the floor or ground and the hopper supported by the pan in elevated position.

Fig. 4 is a fragmentary enlarged view in vertical cross section of the lower end of the assembled hopper and feed pan and showing the manner of connecting the feed pan to the lower telescoping section or the lower end of the hopper with the latter supported in elevated position above the pan to permit discharge of the feed from the hopper into the pan.

Figure 5:
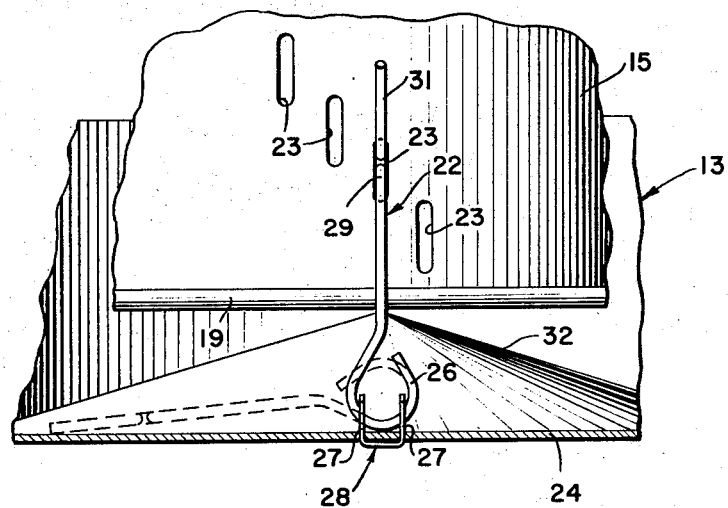
Fig. 5 is a view in vertical cross section taken in a plane represented by the line 5—5 of Fig. 4 and viewed in the direction of the arrows.
Figure 6:
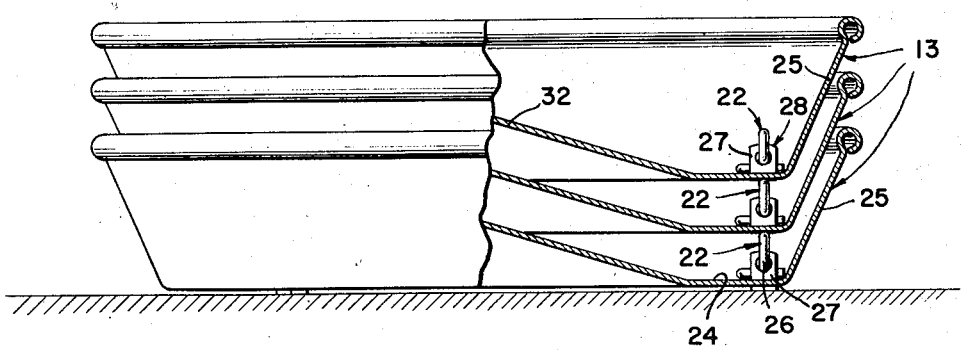
Fig. 6 is a view, part in side elevation and part in vertical cross section, showing the manner of nesting together a plurality of the feed pans and the position of the latches or hook members when pivoted out of operative position and disposed in the bottom of the pans.

Referring more particularly to the disclosure in the drawings and to the novel illustrative embodiment therein shown, the novel poultry feeder comprises a hopper 10 for receiving the feed at the upper open end 11 and discharging this feed through the open bottom or lower end 12 into a feed pan 13. The hopper is preferably formed of telescoping sections 14 and 15 to facilitate shipping with each section of substantially frusto-conical shape for preventing clogging of the feed 16 contained in the hopper and to assure a free flow of the contained feed to the pan 13.

A pivotally mounted bail 17 at the upper end of the upper telescoping section 13 permits the feeder to be hung above the floor or ground in a poultry house or from any suitable support, but the present invention comprehends a feeder in which the pan 13 may be supported directly upon the floor, ground or other supporting surface A, when desired. As shown in Figs. 1 and 3, the upper end of each of the telescoping sections 14 and 15 is provided with an internal bead 18 and the lower end with an external bead 19, and to support these sections in elevated and extended position the external bead 19 on the upper telescoping section 14 rides over a plurality of circumferentially spaced detents or dimples 21 formed adjacent to but spaced from the upper internal bead 18 on the lower telescoping section 15 whereby the external bead 19 on the upper section 14 is retained between the internal bead 18 on the lower section 15 and its detents 21 so as to interlock these sections and retain them in extended relation to form the hopper 10.

With the usual type of hanging feeder the feed pan 13 is suspended above the floor to facilitate cleaning of any litter from beneath the same without moving the feeding device. But when feeding chicks or small fowl, the pan 13 when suspended in elevated position is found to be too high for the chicks to reach the feed and permit effective feeding. However, unless a feeder of the construction of my co-pending application Serial No. 429,727 is hung or suspended in an elevated position, there is no provision for rigidly and effectively supporting the hopper in elevated position above the pan and maintaining the hopper in such elevated position to permit dispensing the feed from the hopper into the feed pan.

In the present invention, the feed pan 13 is provided with novel spaced latches or hook members 22 so constructed and arranged that when they engage in an aligned slot in one set of multiple elongated slots or notches 23 in the lower section 15 or lower end of the hopper 10, these latches or hook members securely join the hopper to the feed pan either when the feeding device is suspended or when the bail is disconnected from an elevated support and the pan is placed upon the floor, ground or other supporting surface so that the feed 16 in the pan 13 is made more readily available to chicks or other small fowl or poultry. These slots or notches 23 of each set are laterally spaced and vertically staggered as shown in Fig. 5, with a set of these slots being provided for each latch or hook member 22, the latter being preferably spaced equally about the base or bottom 24 of the feed pan 13 adjacent its upstanding side, rim or peripheral flange 25.

Each latch or hook member 22 has its one or lower end 26 pivotally mounted in the upstanding legs 27 of a U-shaped bracket 28 with these legs projecting upwardly through spaced slots in the base 24 of the pan 13 and with the base of the bracket 28 disposed below the base 24 of the pan. The free end of each latch or hook member 22 is provided with a loop 29 of somewhat less length than the slots 23 and forming a hook or catch and a projection 31 for retaining each hook or catch in a selected one of the plurality of slots or notches 23.

When the hopper 10 is suspended by the bail 17, the loop or hook 29 of each latch or hook member 22 seats upon the lower edge of its slot 23 in the manner shown in Figs. 1 and 4, and when the pan 13 is supported upon the floor or ground to make it more accessible for smaller poultry or chicks, these latches or hook members 22 support and maintain the hopper in elevated position in the horizontally arranged and aligned slots 23. The latter position is shown in Fig. 3 in which the loop or hook 29 of each latch or hook member 22 seats against the upper edge of its slot 23 to support the hopper 10 in elevated, extended position.

When these latches or hook members 22 are in the uppermost series of slots 23, the lower end 12 of the hopper is disposed closely adjacent to or on the base 24 of the feed pan 13, and when these latches or hook members are in their lowermost slots 23 the hopper 10 is in its most elevated position relative to the feed pan, with the spacing between the lower end 12 of the hopper and the base 24 of the feed pan 13 being greatest for dispensing the maximum quantity of feed 16 from the hopper 10 to the pan 13. To facilitate this feeding operation, the center 32 of the pan 13 is elevated or raised to direct the feed to the base 24 of the feeding trough of the pan.

Having thus disclosed the invention, I claim:

1. A poultry feeder comprising a hopper for receiving the feed to be dispensed and open at its upper end for replenishing the supply of feed to the hopper and open at its lower end for dispensing the contained feed, said hopper having sets of vertically spaced slots provided in said hopper and with these sets spaced apart about the periphery of said hopper, a pan at the lower end of said hopper from which the feed is dispensed, and spaced latch members pivotally mounted at one end in the pan, each of said latch members having a hook at its free end provided with a looped part adapted to be received in one of the slots in the hopper and a projection extending outwardly and upwardly from said looped part to be disposed at the exterior of the hopper adjacent the slot receiving the hook whereby said latch members are adapted to securely support the hopper upon the pan or to suspend the pan from said hopper.

2. A poultry feeder comprising a hopper for receiving the feed to be dispensed and open at its upper end for replenishing the supply of feed to the hopper and at its lower end for dispensing the contained feed, said hopper having spaced sets of multiple elongated slots with the slots of each set arranged in offset and vertically staggered relation, a pan at the lower end of said hopper from which the feed is dispensed, multiple latch members spaced about the pan with a latch member for each set of slots, spaced upstanding brackets in the base of the pan with each bracket adapted to pivotally support an end of a latch member, said latch members each having at its free end a supporting catch adapted to be received in a selected slot of a spaced set and a projection at the exterior of each catch for retaining its catch in the selected slot whereby the hopper is supported and retained by the pan in elevated position by said multiple latch members.

3. A poultry feeder comprising a substantially cylindrical hopper for receiving the feed to be dispensed and open at its lower end for dispensing the contained feed, said hopper having spaced sets of vertically arranged and spaced slots in the circumference of and adjacent the lower portion of the hopper, a pan beneath the hopper provided with an annular dispensing trough about the lower end of the hopper for receiving and dispensing the feed from the hopper, and spaced hook members each connected and freely pivoted at its lower end in the trough of the pan and at its upper end provided with a catch adapted to be detachably received in a selected slot of one of the spaced sets whereby said spaced hook members adjustably mount the pan and lower end of the hopper in predetermined spaced relation for the discharge of feed from the hopper into the pan, each of said catches being provided with a loop and a lateral projection with the loop conformably received in a slot and when the loop of each of said catches is received in a selected, aligned slot of said spaced sets the hopper and pan are held assembled whether the pan is suspended from the hopper above the floor or ground or the pan rests upon the floor or ground and supports the hopper thereabove, said projections locating and retaining the loops in said slots.

4. In a poultry feeder including a hopper and a pan for receiving feed from the hopper, said hopper having spaced sets of slots with the slots in each set similarly arranged and uniformly spaced apart, spaced latch members for detachably connecting the hopper to the pan, and means for pivotally mounting each of said latch members at its lower end upon the base of the pan, the upper free end of each of said latch members provided with a hook part adapted to be detachably received in a slot of one set, said latch members being freely pivoted to lay substantially flat on the base to permit a plurality of said pans to be nested together for shipping or storage.

References Cited in the file of this patent

UNITED STATES PATENTS

| | | |
|---|---|---|
| 1,106,547 | Crabill | Aug. 11, 1914 |
| 1,114,892 | Lawlor | Oct. 27, 1914 |
| 1,790,045 | Harvey | Jan. 27, 1931 |
| 2,660,150 | Kalb | Nov. 24, 1953 |

FOREIGN PATENTS

| | | |
|---|---|---|
| 138,455 | Great Britain | Feb. 12, 1920 |